United States Patent [19]

Simm et al.

[11] Patent Number: 4,681,734

[45] Date of Patent: Jul. 21, 1987

[54] HEAT SPRAYING MATERIAL AND MANUFACTURING PROCESS THEREOF

[75] Inventors: Wolfgang Simm, Ecublens; Hans-Theo Steine, Chavannes, both of Switzerland

[73] Assignee: Castolin S.A., Saint-Sulpice, Switzerland

[21] Appl. No.: 783,933

[22] PCT Filed: Jan. 24, 1985

[86] PCT No.: PCT/CH85/00011

§ 371 Date: Sep. 26, 1985

§ 102(e) Date: Sep. 26, 1985

[87] PCT Pub. No.: WO85/03465

PCT Pub. Date: Aug. 15, 1985

[30] Foreign Application Priority Data

Jan. 31, 1984 [CH] Switzerland ............... 432/84

[51] Int. Cl.$^4$ ............................................... B22F 7/00
[52] U.S. Cl. ........................... 419/9; 75/0.5 BA; 75/0.5 C; 264/5; 264/12; 419/8
[58] Field of Search .................. 75/0.5 C, 0.5 BA; 264/5, 12; 419/8, 9; 428/553, 564

[56] References Cited

U.S. PATENT DOCUMENTS

| | | | |
|---|---|---|---|
| 4,297,135 | 10/1981 | Giessen et al. | 75/238 |
| 4,355,057 | 10/1982 | Slaughter | 264/8 |
| 4,377,375 | 3/1983 | Slaughter | 264/8 |
| 4,385,929 | 5/1983 | Ichidate et al. | 264/12 |
| 4,420,336 | 12/1983 | Klar et al. | 75/246 |
| 4,430,115 | 2/1984 | Ray et al. | 75/251 |
| 4,437,883 | 3/1984 | Kubo et al. | 264/12 |
| 4,540,546 | 9/1985 | Giessen | 264/8 |

Primary Examiner—Stephen J. Lechert, Jr.
Attorney, Agent, or Firm—Hopgood, Calimafde, Kalil, Blaustein & Judlowe

[57] ABSTRACT

A powdery material is prepared by atomization from a molten alloy having the following composition in weight percent: chromium: 10–30; aluminium: 1–25; carbon: less than 0.5; nickel: less than 10; iron: the balance, with a cooling speed at least equal to 400° C./sec., for heat spraying having a grain size comprised between −150 and +27 microns of which the specific area is higher than 500 cm$^2$/g. Said material enables to form on a metal substrate a self-adhesive layer having a resistance to pulling by traction which is higher than 20 N/mm$^2$.

12 Claims, No Drawings

HEAT SPRAYING MATERIAL AND MANUFACTURING PROCESS THEREOF

The invention relates to a method of manufacture of a powdery material for thermal spraying (plasma or flame spraying), a material comprising a powder manufactured by this method as well as the employment of this material for the deposition by thermal spraying of a self-adhesive layer upon a substrate.

In the case of numerous alloys intended for being applied by thermal spraying onto a workpiece in order to form over its surface a protective coating, it proves necessary to apply previously over the substrate an intermediate layer in order to improve the adhesion between the substrate and the layer of protective coating.

Such intermediate layers intended for improving the adhesion to the substrate, are likewise obtained by thermal spraying of powdery materials which usually consist of Mo, NiAl, NiCrAl or NiAlMo. In particular in the case of the employment of nickel alloys containing additions of Al, Mo and Cr, one may obtain bond strengths higher than 20 N/mm².

In addition attempts have been made to employ for the achievement of adhesive layers or self-adhesive layers of materials having a base of Fe, Co and Cu, instead of nickel alloys but it has, however, been impossible to obtain by means of these materials a sufficient adhesive strength with respect to a substrate.

The aim of the invention is to enable a material for thermal spraying to be obtained, which allows the production of a self-adhesive layer having a bond strenghth (as measured by standard tearing test by tension) higher than 20 N/mm²upon a substrate, this material being free of nickel or containing only up to 10% of it by weight. The invention is aimed in particular at enabling the production of adhesive layers and of self-adhesive protective layers which exhibit a high resistance to corrosion by hot gases, more particularly in the presence of sulphur derivatives.

This result is obtained in accordance with the invention, thanks to the employment for the production of the layer by thermal spraying, of a thermal spraying material which contains a powder manufactured by the method in accordance with the invention. This method is characterized in that a molten alloy of composition by weight: chromium: 10 to 30%; aluminium: 1 to 25%; carbon: less than 0.5%; nickel: less than 10%; iron: the remainder; is subjected to atomization from the liquid state with a cooling speed of at least 400° C./sec. and ranging up to 5000° C./sec., so as to produce a powder having a grain size of from −150 to +27 microns, the specific surface of which is higher than 500 cm²/g. The speed of cooling advantageously lies between 600° and 5000° C./sec. Equally advantageously the specific surface of the powder is higher than 750 cm²/g. Preferably the alloy contains up to 2% by weight of one or more elements chosen from the following: Zr, Ce and Y. Equally preferably the alloy may contain from 0.5 to 5% by weight of molybdenum and/or 0.5 to 5% by weight of titanium or tantalum.

The material for thermal spraying advantageously contains in the form of a mixture, at least 20% by weight of the powder manufactured by the method in accordance with the invention and up to 80% by weight of at least one hard material as powder. This hard material is advantageously chosen form metallic oxides and carbides.

The material in accordance with the invention advantageously contains in the form of a mixture at least 20% by weight of the said powder and up to 80% by weight of a metallic powder chosen from the group consisting of the following elements: W, Mo, Ta, Ti and Cr. Equally advantageously the material in accordance with the invention may contain up to 80% by weight of an alloy having a base of iron, nickel or cobalt. By "alloy having a base of iron, nickel or cobalt" is to be understood, within the scope of the present invention, an alloy containing from 50 to 99% by weight of iron, nickel or cobalt and at least one other element and the composition of which lies respectively within the following limits (expressed in percent by weight):

| Iron-based alloys: | |
|---|---|
| Iron | 50 to 99 |
| Chromium | 0 to 30 |
| Carbon | 0 to 2 |
| Nickel | 0 to 25 |
| Silicon | 0 to 4 |
| Aluminium | 0 to 10 |
| Tungsten | 0 to 5 |
| Molybdenum | 0 to 5 |
| Other elements (total amount) | 0 to 5 |
| Nickel-based alloys: | |
| Nickel | 50 to 99 |
| Chromium | 0 to 30 |
| Silicon | 0 to 4 |
| Iron | 0 to 10 |
| Tungsten | 0 to 6 |
| Molybdenum | 0 to 10 |
| Aluminium | 0 to 10 |
| Other elements (total amount) | 0 to 5 |
| Cobalt-based alloys: | |
| Cobalt | 50 to 99 |
| Chromium | 0 to 35 |
| Tungsten | 0 to 15 |
| Molybdenum | 0 to 10 |
| Nickel | 0 to 30 |
| Silicon | 0 to 4 |
| Other elements (total amount) | 0 to 5 |

Surprisingly it has been found that the protective layers obtained by thermal spraying of the material in accordance with the invention reach a tear strength from the substrate which often considerably exceeds the above-specific value of 20 N/mm². On the contrary, in the case of layers obtained by employing in a similar manner powders obtained by usual methods of atomization, this minimum value could not be obtained. The decisive effect obtained thanks to the implementation of the invention may probably be attributed to the fact that the very high speed of cooling at the time of the atomization from the liquid state causes a marked displacement of the state of equilibrium of the phases, which enables the aptitude of reaction of the elements of the alloy to be improved. In particular at the time of the thermal spraying of the particles of the material, exothermal reactions occur which are the cause of these particles not only being brought up to the melting point of the alloy but being heated up to a temperature considerably higher before reaching the surface of the substrate.

Apart from the speed of cooling at least equal to 400° C./sec., preferably lying between 600° and 5000° C./sec., the other parameters of atomization are chosen so as to confer upon the powder obtained a specific surface higher then 500 cm²/g and preferably higher than 750 cm²/g, which corresponds with an irregular shape of the particles, for example, a shape in accordance with which the surface of the particles exhibits numerous roughnesses, which improves the thermal absorptive capacity of the particles as compared to the case of a spheroidal shape.

For the implementation of the atomization (atomization from the liquid state) an installation of known type may be employed, which enables the various parameters to be adjusted, which have an influence upon the obtaining of the above-specific characteristics in the desired manner. Upon this subject reference may be made to the description given in the book by John Keith Beddow having the title "The Production of Metal Powders By Atomization", published by the publishers Beyden & Son Ltd., 1978, as well as to the various references indicated in this book.

In particular, the main parameters which have an influence upon the obtaining of the above-specific characteristics are the diameter as well as the arrangement of the orifice for introducing the metal into the atomization enclosure, the temperature of the molten metal in the tundish, which opens into the orifice of introduction (this temperature being preferably higher by 200° to 300° C. than the melting point of the alloy), the hydrostatic pressure in the metal, the choice of the cooling fluid (for example, water or gas) for the metal in the atomization enclosure, the pressure and the velocity of the cooling fluid, the flight distance (distance travelled by the metal between its leaving the orifice of introduction into the enclosure and its interception by the jets of cooling fluid, this distance lying preferably between 5 and 35 cm when the cooling fluid is a gas such as air and between 5 and 25 cm when the cooling fluid is water), and the angle of incidence of the jets of cooling fluid against the jet of metal.

Detailed examples of the relationship between the said parameters and the characteristics of the powder obtained by atomization are given in particular in chapters 2 (pages 10 to 26), 4 (pages 44 to 65) and 5 (pages 66 to 75) of the above-mentioned book.

The powdery material obtained in the above manner may be employed alone for the manufacture of an adhesive layer or of a self-adhesive protective layer. However, this material may equally well be employed in a mixture with another powdery material. In particular one may employ in amounts corresponding with at least 20% by weight of the powder employed as matrix, up to 80% by weight of a hard material as powder, chosen preferably from the metallic oxides, for example, zirconium oxide, aluminium oxide. etc., or the carbides of refractory metals such as tungsten, molybdenum, tantalum, titanium, chromium, or else these refractory metals as powder.

The alloy from which the powdery material in accordance with the invention is produced, preferably contains up to 2% by weight of one or more of the elements Zr, Ce and Y, with a view especially to increasing the reactivity of the powder in the case where the conditions of employment of the layer obtained by thermal spraying of this powder allow the use of such additive elements. In addition, in relation to the desired characteristics of resistance to heat and resistance to corrosion, especially with a view to harmonizing these characteristics between them, the use may be envisaged of additions to the alloy of from 0.5 to 5% by weight of molybdenum and/or titanium or tantalum.

EXAMPLE 1

An alloy having the following composition in percent by weight:

|  |  |  |
|---|---|---|
|  | 25.0 | Cr |
|  | 7.0 | Al |
|  | 1.5 | Ni |
| less than | 0.1 | C |
| remainder |  | Fe | is atomized from the liquid state in an atomization installation with a cooling speed of 800° C./sec. The powder thus obtained consists of particles of irregular shapes exhibiting roughnesses. After screening to a grain size of from −150 to +27 microns, the specific surface of the powder is determined by the methods well known in powder metallurgy. The values of specific surface thus obtained lay between 700 and 750 cm²/g.

The powder thus obtained is sprayed by employing a flame spraying installation of usual type (in this particular case the Applicants' installation type CDS 20 000) onto two test pieces of St 37 steel with a view to the determination of the tear strength of the layer thus obtained, in accordance with the standards DIN 50160. The tear tests thus obtained have enabled values of bond strength to be obtained, lying between 28.0 and 30.0 N/mm².

EXAMPLE 2

The powder employed in Example 1 is mixed with a powder of Al₂O₃ of grain size from −75 to +37 microns in the proportion by weight of 50:50 and the mixture is sprayed by thermal spraying against the surface of a workpiece intended to be employed in a furnace under severe conditions of oxidation in an atmosphere containing sulphur. A self-adhesive layer was obtained, having a bond strength of 25 N/mm² which has proved very resistant to wear.

I claim:

1. A method of manufacture of a powdery material for thermal spraying, characterized in that a molten alloy of composition by weight: chromium: 10 to 30%; aluminium: 1 to 25%; carbon: less than 0.5%; nickel: less than 10%; iron: the remainder; is subjected to atomization from the liquid state with a cooling speed of at least 400° C./sec. and ranging up to 5000° C./sec., so as to produce a powder having a grain size of from −150 to +27 microns, the specific surface of which is higher than 500 cm²/g.

2. A method as in claim 1, characterized in that the cooling speed lies between 600° and 5000° C./sec.

3. A method as in claim 1 or claim 2, characterized in that the specific surface of the powder is higher than 750 cm²/g.

4. A method as in one of the claims 1 to 3, characterized in that the alloy contains up to 2% by weight of one or more elements chosen from the following: Zr, Ce and Y.

5. A method as in one of the claims 1 to 4, characterized in that the alloy contains from 0.5 to 5% by weight of molybdenum and/or from 0.5 to 5% by weight of titanium.

6. A material for thermal spraying, containing a powder manufactured by the method as in one of the claims 1 to 5.

7. A material as in claim 6, characterized in that it contains in the form of a mixture, at least 20% by weight of the said powder and up to 80% by weight of at least one hard material as powder.

8. A material as in claim 7, characterized in that the said hard material is chosen from the metallic oxides and carbides.

9. A material as in one of the claims 6 to 8, characterized in that it contains in the form of a mixture, at least 20% by weight of the said powder and up to 80% by weight of a metallic powder chosen from the group consisting of the following elements: W, Mo, Ta, Ti and Cr.

10. A material as in one of the claims 6 to 8, characterized in that it contains up to 80% by weight of an alloy having a base of iron, nickel or cobalt.

11. Employment of the material as in one of the claims 6 to 9 for the deposition by thermal spraying of a self-adhesive layer on a substrate.

12. A method of producing a thermal sprayed self-adhesive layer of an alloy on a metal substrate which comprises thermal spraying a powdered alloy composition containing by weight 10 to 30% chromium, 1 to 25% aluminum, less than 0.5% carbon, less than 10% nickel and the remainder iron, said alloy powder having been formed by atomization from the liquid state with a cooling speed of at least 400° C./sec. and ranging up to 5000° C./sec., said powdered alloy having a grain size of from $-150$ to $+27$ microns and a specific surface higher than 500 $Cm^2$/gram.

* * * * *